Feb. 28, 1928.

M. CHRISTMAN 1,660,433

LUBRICATING DEVICE

Filed Nov. 22, 1924

Inventor
Matthias Christman

By C. M. Farken
Attorney

Patented Feb. 28, 1928.

1,660,433

UNITED STATES PATENT OFFICE.

MATTHIAS CHRISTMAN, OF SPRINGFIELD, MISSOURI.

LUBRICATING DEVICE.

Application filed November 22, 1924. Serial No. 751,686.

This invention relates to lubricating devices, and more particularly to lubricating devices for locomotive wheels.

In a prior Patent No. 1,241,343, granted September 25, 1917, I have described and claimed a hub plate for locomotive wheels, which is provided with recesses for the reception of lubricant and in which the lubricant is delivered thereto through a passage from the outside of the wheel.

In more recent locomotive construction, the bearing boxes are placed on the outside of the wheels and the engine frame is arranged on the outside of the wheel with the driving gears arranged on the inside. The construction shown in my prior patent is not particularly adapted for use in the lubrication of locomotive wheels of this character.

In the present invention, I provide a lubricating device which may be employed either on the outside or the inside of a locomotive wheel, depending upon the position of the bearing box. In this invention, I provide a hub liner arranged between the hub of the wheel and the bearing box and provided with recesses for the reception of lubricant. The hub of the wheel may be provided with similar recesses and suitable passages are arranged in the bearing box through which the lubricant is delivered.

Figure 1:
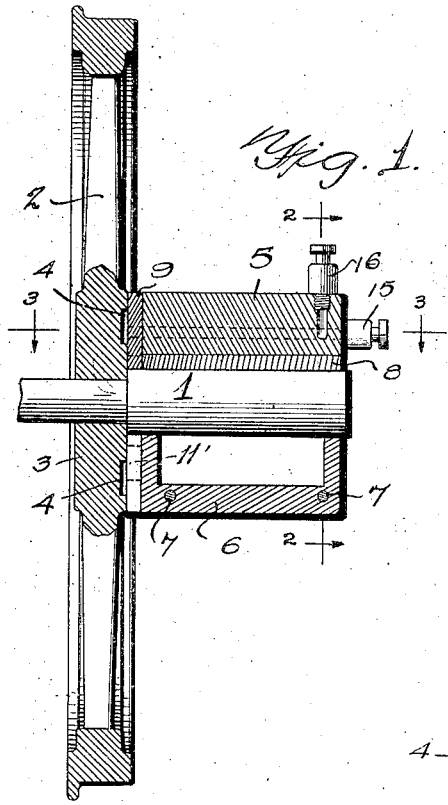
Figure 2:
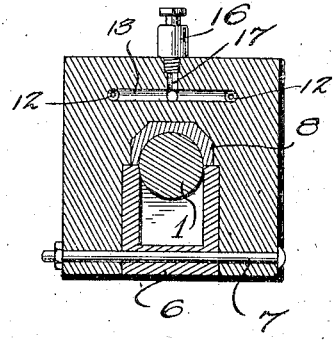
Figure 3:
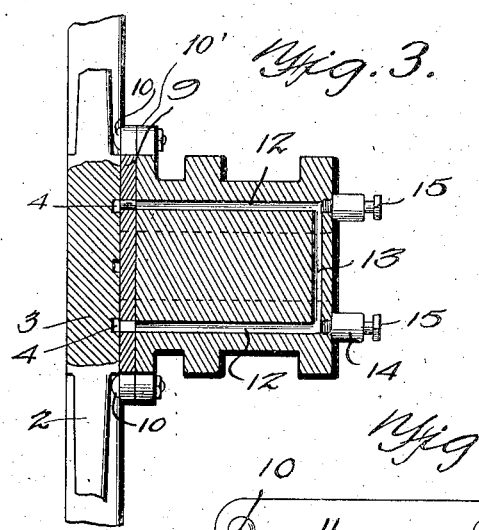
Figure 4:
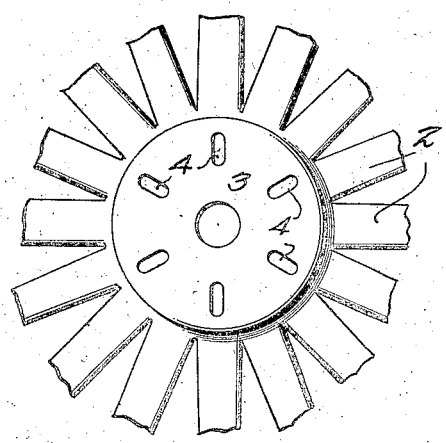
Figure 5:
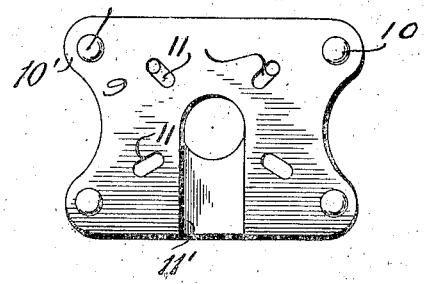

In the accompanying drawings, I have shown one embodiment of the invention. In this showing:

Figure 1 is a vertical sectional view of a locomotive axle and wheel showing the invention applied, Figure 2 is a vertical sectional view on line 2—2 of Figure 1, Figure 3 is a horizontal sectional view on line 3—3 of Figure 1, Figure 4 is an elevation of the hub of a locomotive wheel showing recesses formed in the face, and, Figure 5 is a front elevation of the bearing box and hub liner removed.

Referring to the drawings, the reference numeral 1 designates an axle of ordinary construction, adapted to receive a locomotive wheel 2. The wheel is provided with a hub 3 having an opening for the reception of the axle and the face of the wheel adjacent the bearing box may be provided with spaced concentric recesses 4. A bearing box 5 is arranged on either side of the wheel and adapted to receive a portion of the axle. The bearing box is provided with the usual lubricant cellar 6, in which packing may be arranged and this lubricant cellar is retained in position by means of bolts 7. The bearing box may be further provided with the usual bearing box brass 8, contacting with the upper half of the axle. A hub liner 9 is arranged between the hub of the wheel and the bearing box and this hub liner is secured to the bearing box in any suitable manner, as by means of bolts 10 passing through ears 10' formed on the liner and bearing box outwardly of the hub of the wheel. The shape and size of the hub liner may, of course, be varied according to the design of the bearing box. The hub liner is provided with circularly arranged recesses 11 arranged the same distance from the center of the axle as the recesses 4 in the hub and adapted to coincide therewith as the wheel revolves. The liner is shaped as shown in Figure 5, being provided in one side with a lateral opening 11' through which the axle may pass when the liner is placed in position.

The bearing box is provided with a pair of longitudinal passages 12, which may be connected by a transverse passage 13. Grease cups 14 are arranged at the outer end of these passages and these cups are provided with filling plugs 15. A similar grease cup 16 may be arranged on top of the bearing box at the upper end of a vertical passage 17, communicating with the transverse passage 13. As shown, the inner ends of the passages 12 communicate with a pair of the recesses 11, which extend entirely through the hub liner.

The operation of the device will be apparent from the foregoing description. Locomotive wheels are lubricated with a relatively heavy non-flowing grease generally known as driving box grease or pin grease. This lubricant is heavy and will not flow. By filling the cups 14 and 16, and then screwing the plugs inwardly, the lubricant is forced through the passages 12 and the upper recesses 11, whence it is taken up by the recesses 4 in the hub to lubricate the hub of the wheel as the locomotive wheel revolves. When a bearing box is arranged on the outside of the wheel, the wheel may be lubricated without getting under the locomotive. Particular attention is invited to the fact that the liner 10 may be replaced when desired or necessary without dropping the wheel of the locomotive. The fastening means for the liner are arranged outwardly of the hub of the wheel to permit them to be inserted and removed without disturbing the wheel and the lateral opening 11' in the liner permits the latter to be inserted without dropping the wheel thus constituting an important improvement over similar devices which previously have been used, such devices being of such character as to require that a locomotive be jacked up and the wheels dropped when it becomes necessary to replace a liner.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. The combination of a wheel including a hub having a flat bearing face provided with lubricant receiving recesses, an axle for the hub, a bearing box having a lubricant passageway therein and provided with a wholly flat face adjacent the hub of the wheel, and a hub liner carried by said bearing box against the flat face thereof and fitted against the bearing face of said hub, said liner having a plurality of recesses in the face thereof adjacent the hub of the wheel and being provided with an opening communicating between one of said last named recesses and the lubricant passage-way of said bearing box, the recesses of said liner being adapted to successively register and communicate with the recesses of said hub as the wheel rotates.

2. The combination with a wheel including a hub having a flat bearing face provided with a plurality of circularly arranged radially disposed lubricant receiving recesses, an axle for the hub, a bearing box for the axle provided with a pair of lubricant passage-ways extending therethrough, means for forcing lubricant under pressure through said passage-ways, the face of said bearing box adjacent the hub of the wheel being flat throughout its area, and a hub liner corresponding in shape to and arranged against the flat face of said bearing box and secured to said box outwardly of said hub, said liner being provided in one face with a plurality of lubricant recesses corresponding in arrangement to the recesses in said hub and adapted to successively register therewith as the wheel rotates, a pair of said last named recesses communicating with said lubricant passage-ways to receive lubricant therefrom.

3. The combination of a wheel including a hub having a flat bearing face, an axle for the hub, a bearing box having a lubricant passage-way therein and provided with a wholly flat face arranged adjacent and parallel to the bearing face of the hub, and a flat hub liner arranged between the hub of the wheel and said bearing box and secured against the flat face thereof, said liner being provided in one edge thereof with a lateral opening through which the axle is adapted to move whereby said liner is adapted to be inserted in position laterally with respect to said axle, said liner being provided with a plurality of recesses in the face thereof adjacent the bearing face of the hub and being provided with an opening communicating between one of said recesses and the lubricant passage-way of said bearing box.

4. The combination of a wheel including a hub having a flat bearing face provided with lubricant receiving recesses, an axle for the hub, a bearing box having a lubricant passage-way therein and provided with a wholly flat face arranged adjacent and parallel to the bearing face of the hub, and a flat hub liner arranged between the hub of the wheel and said bearing box and secured against the flat face thereof, said liner being provided in one edge thereof with a lateral opening through which the axle is adapted to move whereby said liner is adapted to be inserted in position laterally with respect to said axle, said liner being provided with a plurality of recesses in the face thereof adjacent the bearing face of the hub and being provided with an opening communicating between one of said last named recesses and the lubricant passage-way of said bearing box, the recesses of said liner being adapted to successively register and communicate with the recesses of said hub as the wheel rotates.

In testimony whereof, I affix my signature.

MATTHIAS CHRISTMAN.